(12) United States Patent
Sekita

(10) Patent No.: US 11,690,388 B2
(45) Date of Patent: Jul. 4, 2023

(54) WATERLESS ICE CRYSTAL NUCLEATOR FOR SUPERCOOLED BEVERAGES

(71) Applicant: THE COCA-COLA COMPANY, Atlanta, GA (US)

(72) Inventor: Miyako Sekita, Tokyo (JP)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/489,427

(22) PCT Filed: Feb. 27, 2018

(86) PCT No.: PCT/US2018/020021
§ 371 (c)(1),
(2) Date: Aug. 28, 2019

(87) PCT Pub. No.: WO2018/160594
PCT Pub. Date: Sep. 7, 2018

(65) Prior Publication Data
US 2020/0008448 A1 Jan. 9, 2020

Related U.S. Application Data

(60) Provisional application No. 62/464,490, filed on Feb. 28, 2017.

(51) Int. Cl.
*A23L 5/30* (2016.01)
*A23G 9/04* (2006.01)
(Continued)

(52) U.S. Cl.
CPC ............... *A23L 2/00* (2013.01); *A23G 9/045* (2013.01); *A23L 3/005* (2013.01); *A23L 3/32* (2013.01);
(Continued)

(58) Field of Classification Search
CPC . A23G 9/045; A23L 2/00; A23L 3/005; A23L 3/32; A23L 5/32; A23V 2002/00; B67D 1/0857; F25D 31/00; F25D 31/007
(Continued)

(56) References Cited

U.S. PATENT DOCUMENTS 5,880,359 A 3/1999 Kono
6,686,195 B1 2/2004 Colin et al.
(Continued)

FOREIGN PATENT DOCUMENTS

AU 2011236097 A1 11/2011
CN 205205118 U * 5/2016
(Continued)

OTHER PUBLICATIONS

G. Hayward, "Through transmission ultrasonic NDT without coupling fluids," IEE Colloquium on Non-Contacting and Remote NDT, London, UK, 1992, pp. 6/1-6/2. (Year: 1992).*
(Continued)

*Primary Examiner* — Joseph F Trpisovsky
(74) *Attorney, Agent, or Firm* — Meunier Carlin & Curfman LLC

(57) ABSTRACT

A beverage nucleator system for a supercooled beverage container may include a frame for receiving a beverage container and an ultrasonic device positioned therein. The frame may include a beverage container aperture therein sized to allow direct contact between an ultrasonic transmitter coupled to the ultrasonic device and a closure on the container. The ultrasonic transmitter may operate at a 28 kHz frequency with a power of 5 W for 1-5 seconds. The beverage nucleator system can operate without requiring a fluid or gel transmission medium.

17 Claims, 7 Drawing Sheets

(51) Int. Cl.
*F25D 31/00* (2006.01)
*B67D 1/08* (2006.01)
*A23L 2/00* (2006.01)
*A23L 3/005* (2006.01)
*A23L 3/32* (2006.01)

(52) U.S. Cl.
CPC ............... *A23L 5/32* (2016.08); *F25D 31/00* (2013.01); *F25D 31/007* (2013.01); *A23V 2002/00* (2013.01); *B67D 1/0857* (2013.01)

(58) Field of Classification Search
USPC .......................................................... 99/451
See application file for complete search history.

(56) References Cited

U.S. PATENT DOCUMENTS

| | | | |
|---|---|---|---|
| 10,149,487 B2* | 12/2018 | Shuntich | ............... A23G 9/08 |
| 2004/0026600 A1 | 2/2004 | Horen | |
| 2005/0258711 A1 | 11/2005 | Funakubo | |
| 2007/0209520 A1* | 9/2007 | Ho | ......................... C12H 1/16 99/275 |
| 2011/0308264 A1 | 12/2011 | Youn et al. | |
| 2013/0074602 A1 | 3/2013 | Jackson | |
| 2015/0030729 A1 | 1/2015 | Hopkins | |
| 2015/0264968 A1 | 9/2015 | Shuntich | |

FOREIGN PATENT DOCUMENTS

| | | | |
|---|---|---|---|
| CN | 106288648 A | | 1/2017 |
| EP | 1078038 B1 | | 7/2003 |
| EP | 1466966 A1 | | 10/2004 |
| JP | H05115846 A | | 5/1993 |
| JP | H06233560 A | | 8/1994 |
| JP | H07337047 A | | 12/1995 |
| JP | 2005318869 A | | 11/2005 |
| JP | 2005333749 A | | 12/2005 |
| KR | 10-2008-0088944 A | | 10/2008 |
| KR | 20080088943 A | * | 10/2008 |
| KR | 10-2010-0018887 A | | 2/2010 |
| WO | 2015/188068 A1 | | 12/2015 |
| WO | 2018/160594 A1 | | 9/2018 |

OTHER PUBLICATIONS

International Search Report and Written Opinion, issued by the International Searching Authority (ISA/KR) in Application No. PCT/US2019/025286 dated Jan. 2, 2020. 9 pages.
Supplementary European Search Report for European Application No. 18761855.8 dated Nov. 30, 2020.
Written Opinion for Singapore Application No. 11201907888U dated Dec. 1, 2020.
Search Report for Singapore Application No. 11201907888U dated Dec. 1, 2020.
International Search Report and Written Opinion issued by the International Searching Authority (ISA/KR) in application No. PCT/US2018/020021 dated Jun. 7, 2018. 16 pages.
T-Arts. "Sonic Hour Portable White by T-Arts." Screenshot from https://www.amazon.com/Sonic-Hour-Portable-White-T-Arts/dp/B00OPPTEYO/ref=sr_1_1?keywords=sonic+hour+portable+by+t-arts&qid=1567001385&s=beauty&sr=1-1-catcorr.
International Preliminary Report on Patentability issued by the International Bureau of WIPO in application No. PCT/US2018/020021 dated Sep. 12, 2019. 10 pages.
English Translation of Notice of Reasons for Rejection issued in JP 2019-546397, dated Aug. 3, 2021.
Written Opinion for Singapore Application No. 11201907888U dated Feb. 21, 2022.
English Summary of Chinese Office Action issued in CN 2018800222319, dated May 23, 2022.
Extended European Search Report issued in EP 19922932.9, dated Sep. 16, 2022.
English Summary of Office Action issued in CN2018800222319, dated Sep. 27, 2022.
Deting Tan, Automatic Detection Technology, China Railway Publishing House, Aug. 2008, 1st edition, 1st printing, p. 69, English Machine Translation.
Tiezhi Zhang, Mechanical and Electrical Technology of Traffic Civil Engineering, Metallurgical Industry Press, Apr. 2013, 1st edition, 1st printing, pp. 60-61, English Machine Translation.
Examination report issued in Australian application No. AU2018227711, dated Feb. 8, 2023.
English translation of Chinese Office Action issued in Chinese Application No. 2018800222319 dated Mar. 1, 2023.
English translation of Japanese Office Action issued in Japanese Application No. 2021-0559030, dated Mar. 20, 2023.

* cited by examiner

WATERLESS ICE CRYSTAL NUCLEATOR FOR SUPERCOOLED BEVERAGES

CROSS-REFERENCE TO RELATED APPLICATIONS

This application is a national stage application filed under 35 U.S.C. § 371 of PCT/US2018/020021 filed Feb. 27, 2018, which claims the benefit of U.S. Provisional Patent Application Ser. No. 62/464,490 filed Feb. 28, 2017, the disclosures of which are expressly incorporated herein by reference.

TECHNICAL FIELD

The present application and the resultant patent relate generally to supercooled beverages and more particularly relate to a waterless ice crystal nucleator system for supercooled beverages to initiate ice crystal nucleation in conventional beverage bottles, cans, and other containers.

BACKGROUND OF THE INVENTION

Generally described, supercooled beverages are increasingly popular. Specifically, supercooled beverages may be cooled to a temperature below freezing such that ice crystals may form after the container holding the beverage is opened or after energy is otherwise imparted to the beverage so as to initiate nucleation of the ice crystals. Conventional carbonated soft drinks may contain sufficient energy therein upon the opening of the container and the initial release of carbon dioxide to initiate ice crystal nucleation. Non-carbonated beverages such as waters, dairy-based beverages, sports drinks, coffees, teas, and the like, however, may require additional energy to initiate ice crystal nucleation therein.

One method of providing additional energy to initiate ice crystal nucleation has been with the use of ultrasonic energy. Know ultrasonic methods, however, generally use a fluid bath as the ultrasonic transmitting material between the beverage container and the ultrasonic transmitter. Although the use of the fluid bath may be an effective transmission medium, repeated use of such fluids in a commercial setting and the like may be problematic due to spills, dripping, and other types of potential issues. The operator had to frequently clean and refill the fluid bath. Moreover, failure to do so may result in an unsatisfactory appearance to a consumer.

SUMMARY OF THE INVENTION

The present application and the resultant patent provide a beverage nucleator system for a supercooled beverage container. The beverage nucleator system may include an ultrasonic device and an ultrasonic bracket holder with the ultrasonic device positioned therein. The ultrasonic bracket holder may include a beverage container aperture therein sized to allow for direct contact between the ultrasonic device and the container.

The present application and the resultant patent further describe a method of providing a bottle of a supercooled beverage. The method may include the steps of supercooling the beverage, placing a closure of the bottle in direct contact with an ultrasonic device, transmitting ultrasonic energy into the beverage, and causing ice crystal nucleation within the beverage.

Some aspects of the disclosure provide a beverage nucleator system for a supercooled beverage container that comprises an ultrasonic device with an ultrasonic transmitter. The beverage nucleator system also comprises a frame with the ultrasonic device positioned therein and a beverage container aperture therein. The beverage container aperture is sized to allow for direct contact between the ultrasonic transmitter and the container.

In some aspects of the disclosure, the container comprises a bottle with a closure and wherein the beverage container aperture is sized for receiving the closure. The direct contact on the container is on the closure.

In any of the above aspects of the disclosure, the ultrasonic device comprises a contact switch. The contact switch is positioned adjacent to the beverage container aperture.

In any of the above aspects of the disclosure, the frame comprises an upper ledge and wherein the upper ledge comprises the beverage container aperture.

In any of the above aspects of the disclosure, the ultrasonic device comprises a portable ultrasonic device.

In any of the above aspects of the disclosure, the frame comprises a thermoplastic or a stainless steel.

In any of the above aspects of the disclosure, the ultrasonic device provides point transmission of ultrasonic energy without the use of a fluid transmission medium.

In any of the above aspects of the disclosure, the beverage nucleator system further comprises a button positioned on the frame and configured to activate the ultrasonic device.

In any of the above aspects of the disclosure, the beverage nucleator system further comprises a pressure sensor configured to activate the ultrasonic device upon sensing a threshold pressure.

In any of the above aspects of the disclosure, the frame and the beverage container aperture are configured to receive a beverage container in an inverted position.

In any of the above aspects of the disclosure, the ultrasonic device is configured to provide an ultrasound signal with a frequency between 5-60 kHz, with a power of 3-100 W, for an amount of time between 100 ms-30 s. In some aspects of the disclosure the ultrasonic device is configured to provide an ultrasound signal with a frequency between 20-30 kHz, with a power of 5-10 W, for an amount of time between 1-5 s.

Another aspect of the disclosure provides a method of providing an iced beverage product. The method comprises receiving a supercooled beverage in a bottle with a closure such that the closure of the bottle is in direct contact with an ultrasonic transmitter, wherein the bottle is in an inverted position. The method also comprises transmitting ultrasonic energy from the ultrasonic transmitter into the beverage through the closure to cause ice crystal nucleation within the beverage.

In some aspects of the disclosure, receiving the bottle comprises positioning the closure in a beverage container aperture of a frame that has the ultrasonic transmitter positioned therein.

In any of the above aspects of the disclosure, the method further comprises activating an ultrasonic device to transmit the ultrasonic energy from the ultrasonic transmitter in response to a contact switch closing, a button being pressed, and/or a pressure sensor sensing a threshold pressure.

In any of the above aspects of the disclosure, the step of transmitting ultrasonic energy into the beverage comprises directly transmitting ultrasonic energy through the closure of the bottle without a fluid transmission medium.

In any of the above aspects of the disclosure, the ultrasonic energy comprises a frequency between 5-60 kHz, with a power of 3-100 W, for an amount of time between 100 ms-30 s. In some aspects of the disclosure the ultrasonic energy comprises a frequency between 20-30 kHz, with a power of 5-10 W, for an amount of time between 1-5 s.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
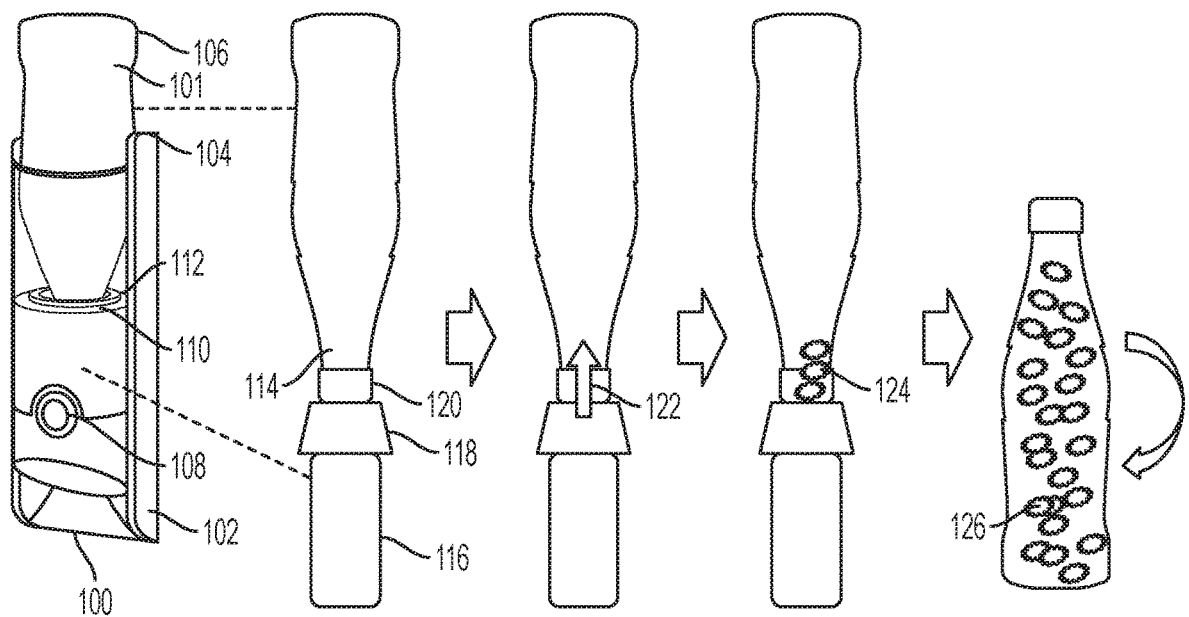
FIG. 1 is a perspective view and operation sequence of a waterless ice crystal nucleator system for a supercool beverage as may be described herein.

Generally, in a beverage liquid that is cooled below its freezing point ice crystals can be formed by providing physical stimulation. Some types of physical stimulation that have been used include an impact pressure applied by dropping or striking a beverage container against a surface or a sudden drop of internal pressure caused by releasing gas from a carbonated beverage during the opening of a beverage closure. However, relying on a drop in pressure limits the physical stimulation to only products with a sufficient amount of carbonation or other internal gas pressure. Also, relying on an impact pressure raises the risk of damage to the product.

While there are several types of physical stimulation that may be used to initiate nucleation of ice crystals in a super cooled liquid, described herein is a use of ultrasonic stimulation. Specifically, described herein is a system and method for transferring ultrasonic energy to a beverage liquid. With the ultrasonic device of the pending disclosure, an icy beverage may be formed from a beverage that is super cooled and provide an improved consumer experience. Such ultrasonic stimulation enables almost all beverage products to be supercooled and have consistent ice crystal formation.

Generally, when using an ultrasonic device, water or other fluid is used as a transmission medium for transmitting the ultrasonic energy between an ultrasound generator and a contact area of beverage product. Such a fluid transmission medium maximizes the ultrasonic conveyance and level of crystallization. However, use of water causes hygiene concerns for beverage products or troublesome and logistical concerns for operation of a shop.

Accordingly, disclosed herein is a nucleator that may initiate ice crystal nucleation in any type of supercooled beverage and beverage container without the use of a fluid bath or other type of transmission medium. Specifically, it has been discovered that ice crystal nucleation can be consistently initiated via direct application of ultrasound to a closure of a supercooled beverage container. The closure is used as the contact point for ultrasonic transmission because the top surface of the closure is more rigid than other parts of a package like the body of a bottle. Using the rigid top surface of the closure enables ensures that the least loss of ultrasonic transmission will occur. Also, there is the least amount of design variation among different beverage packaging types, which enables a more stable ultrasonic transmission without being influenced by the particular product package in use. Accordingly, the ice crystal nucleator disclosed herein facilitates application of ultrasound directly to the closure of the beverage container to initiate nucleation of ice crystals in a supercooled beverage product contained therein.

In use, a consumer may insert a beverage product upside down into the disclosed waterless ultrasonic device such that an ultrasound transmitter is in contact with a closure of the beverage product. The ultrasonic energy from the ultrasound transmitter is transferred from the top surface of the closure to beverage liquid inside the package. This physical stimulation generates some ice crystals in the beverage liquid near the closure. After applying the ultrasonic energy, a consumer may remove the product from waterless ultrasonic device and turns the beverage product back to an upright posture with the closure side up. This turning movement facilitates propagation of the generation of additional ice crystals throughout the supercooled beverage.

Referring now to the drawings, in which like numerals refer to like elements throughout the several views, FIG. 1 shows an example of a waterless ice crystal nucleator system 100 for a supercool beverage as may be described herein. While described herein as a supercooled beverage, any such fluid or flowable material may be used herein, such as for carbonated beverages, non-carbonated beverages, sodas, teas, coffee, water, milk, smoothies, drinkable yogurt, or other flowable food products with a slurry, suspension, heterogeneous, or homogeneous mixture of solids and liquids.

The waterless ice crystal nucleator system 100 may be used with any type of beverage 101 or other consumable flowable product, including both carbonated and non-carbonated products, within any type of conventional container 106 such as bottles, cans, and the like. The beverage container 106 may be made out of glass, metals, thermoplastics, or other types of materials. The beverage container 106 may be enclosed by a conventional closure 120. The closure 120 may be made out of metals, thermoplastics, or other types of materials. The closure 120 may include a cap, crown, tab, or any other type of closure. The closure 120 is opened by a consumer to gain access to the beverage 101 contained within the beverage container 106.

Generally described, the beverage container 106 is maintained within a conventional cooler, vendor, vending machine, or the like at a uniform supercooled temperature. The supercooled temperature is below a freezing point of the beverage 101, but above a temperature at which homogeneous nucleation of the beverage 101 occurs. Once removed from the cooler or other equipment, the beverage container 106 may be placed in the waterless ice crystal nucleator system 100 to initiate nucleation of ice crystals in the beverage 101.

The waterless ice crystal nucleator system 100 includes a frame 102 with an opening 104 sized to receive the beverage container 106. The frame 102 may be made out of any suitable type of rigid materials such as thermoplastics, stainless steels, and the like. The frame 102 may have any suitable size, shape, or configuration. Specifically, the frame 102 may be sized to allow an ultrasonic device 116 to be positioned and supported therein. The waterless ice crystal nucleator system 100 also includes an upper ledge 110 coupled to the frame 102 with a beverage container aperture 112 positioned therein. The aperture 112 is sized to receive the closure 120 of the beverage contain 106. The aperture 112 may also be sized to receive a portion of a neck 114 of the beverage container 106 as well. The beverage container aperture 112 may be positioned about an ultrasound transmitter 118 of the ultrasonic device 116. The aperture 112 allows for the closure 120 of the beverage contain 106 to come into physical contact with the ultrasound transmitter 118. The beverage container aperture 112 may be sized to position and support the beverage container 106 therein in contact with the ultrasound transmitter 118.

In the example of FIG. 1, the opening 104 and the beverage container aperture 112 are sized to position and support the closure 120 of the beverage container 106 therein. The beverage container 106 is alternatively referred to as a bottle 106 in the example shown in FIG. 1. The beverage container aperture 112 may be adjustable and/or different ledges 110 with different sized beverage container apertures 112 may be used to accommodate beverage containers 106 of differing sizes and shapes. Other components and other configurations may be used herein.

In some implementations, the frame 102 may include a number of support arms positioned above a stepped cap guide (not shown). The support arms may be spring loaded to accommodate supporting different package sizes while the stepped cap guide may be spring loaded to accommodate different cap sizes. In use, as a beverage container 106 is lowered, the support arms rotate to adjust to the width of the container 106. That is the support arms rotate around and come in interference with the container 106 to support the container 106 within the frame 102. The weight of the container 106 then pushes the stepped cap guide downward such that the container 106 comes into contact with and is properly centered on the ultrasound transmitter 118. The ultrasonic device 116 then may be activated.

A user interface 108 is positioned on a front surface of the nucleator system 100. The user interface 108 may include one or more indicator lights or other displays that indicate the operational state of the nucleator system 100. The user interface 108 may also include one or more buttons or switches actuatable by a user to activate operation of the nucleator system 100. As shown in FIG. 1, the user interface 108 includes a button with a light ring surrounding the button. Pressing the button initiates operation of the nucleator system 100. Other types of initiation devices such as a switch and the like also may be used herein. The light ring may operate to flash, pulse, circle, and/or change color to indicate different operating states of the nucleator system 100.

The ultrasound transmitter 118 is coupled to the ultrasonic device 116 and configured to transmit ultrasound signals 122 generated by the ultrasonic device 116 to the closure 120 of the beverage container 106. The ultrasonic device 116 may be of conventional design and may have any suitable size, shape, configuration, or frequency range. In an example, the ultrasonic device 116 may be portable. An example of the ultrasonic device 116 is a bolt fastened 28 kHz Langevin transducer. Another example of the ultrasonic device 116 is the "Sonic Hour" ultrasonic transmitter sold by Takara Tomy Arts Company of Japan. Other types of ultrasonic devices and transmitters may be used herein.

The ultrasonic device 116 may be configured to provide an ultrasound signal with a frequency between 5-60 kHz, with a power of 3-100 W, for an amount of time between 100 ms-30 s, with a downward pressure between the closure 120 of beverage product 106 and the ultrasound transmitter 118 of 0-20 N, with a contact area between the closure 120 of beverage product 106 and the ultrasound transmitter 118 between 1-30 mm diameter. In some implementations, a frequency of 28 kHz is used with a power of 5-10 W, for 1-5 seconds, with 0 N of additional downward pressure (downward pressure is only applied by the weight of the product), on a contact area of 30 mm.

In use, the ultrasonic device 116 may be positioned within the frame 102. The beverage container 106 may be removed from a cooler or other type of supercooling refrigeration device and may be inserted into the waterless ice crystal nucleator system 100 in an inverted position. In the case of the use of the bottle 106 show in FIG. 1, the closure 120 of the bottle 106 may be inserted through the opening 104 and into the beverage container aperture 112. The beverage container aperture 112 may support the bottle 106 therein in contact with the ultrasound transmitter 118 of the ultrasonic device 116 at which point the ultrasonic device 116 is activated. For example, a button on the user interface 108 may be selected to activate the ultrasonic device 116. The ultrasonic device 116 thus produces ultrasonic energy 122 that is transmitted by the transmitter 1118 through the closure 120 and into the beverage 101 within the beverage container 106.

The ice crystal nucleation process thus may begin with the formation of ice crystals 124 about the closure 120. The beverage container 106 need only remain within the waterless ice crystal nucleator system 100 for several seconds or so. Upon the removal of the beverage container 106 from the waterless nucleator system 100, a consumer may then orient the beverage container 106 in an upright position. Additional ice crystals 126 form as a result of propagation of the nucleation process through the beverage 101. A consumer then may enjoy the ice filled beverage.

The use of the bottle 106 in the inverted position within the waterless ice crystal supercooling beverage nucleator system 100 was found to promote superior ice crystal nucleation regardless of whether the beverage container 106 was made out of glass, metal, or thermoplastics. The use of the closure 120 positioned about the ultrasonic transmitter 118 may provide for the transfer of increased ultrasonic energy into the beverage 101 as compared to transmission from the sides, the bottom, or other areas of the beverage containers 20. Specifically, the use of the hard, flat, and relatively compact surface of the closure 120 may limit energy losses therethrough for improved ice crystal nucleation therein, as described in more detail below with reference to FIGS. 8A-8F.

The waterless ice crystal nucleator system 100 thus promotes ice crystal nucleation in a supercooled beverage 101 without the use of a fluid bath as the ultrasonic transmission medium. Instead of transmitting the ultrasonic energy through a large area as in the fluid bath, the waterless ice crystal nucleator system 100 provides the ultrasonic energy via point contact for improved ice crystal nucleation in the supercooled beverage 101 without the issues surrounding the use of the fluid bath or other types of transmission mediums.

Figure 2:
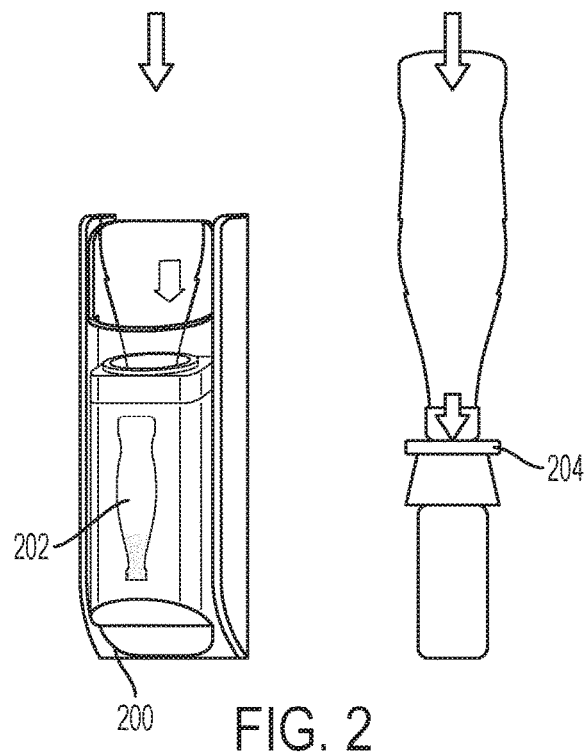
FIG. 2 is a perspective view of an alternative embodiment of a waterless ice crystal nucleator system for a supercool beverage as may be described herein.

FIG. 2 is a perspective view of an alternative embodiment of a waterless ice crystal nucleator system 200 for a supercool beverage as may be described herein. The waterless ice crystal nucleator system 100 is substantially the same as described in FIG. 1 above, with the addition of a display 202 on the user interface 108 as opposed to a button with a light ring, as described above. Also, a pressure sensor 204 is positioned on top of the ultrasound transmitter 118. In contrast with the activation of the waterless ice crystal nucleator system 100 through the use of a button on the user interface 108, the waterless ice crystal nucleator system 200 is activated upon sensing a threshold pressure on the pressure sensor 204. Because the waterless ice crystal nucleator system 200 is activated based on sensing the threshold pressure, a button is not included on the display 202. In some implementations, both a button and the pressure sensor 204 may be used. For example, upon a consumer activating the button on the user interface 108, a check may be performed to ensure that a threshold pressure is also sensed by the pressure sensor 204 prior to activating the waterless ice crystal nucleator system 200.

In some implementations, the threshold pressure may be approximately equal to the weight of the beverage container 106 with the beverage 101 therein. In some examples, the lightest expected beverage container 106 may be used for the threshold pressure. In some examples, the waterless ice crystal nucleator system 200 is activated upon sensing the threshold pressure for a predetermined period of time to account for any bounce or other transient effects upon insertion of the beverage container 106 into the waterless ice crystal nucleator system 200. In another example, the threshold pressure may be larger than the weight of the beverage container 106 to ensure that a consumer is applying downward force on the beverage container 106. The additional downward force provided by the consumer may further facilitate increase transmission of ultrasonic energy into the beverage 101. Other threshold pressures may be used without departing from the spirit or scope of the invention.

Figure 3A:
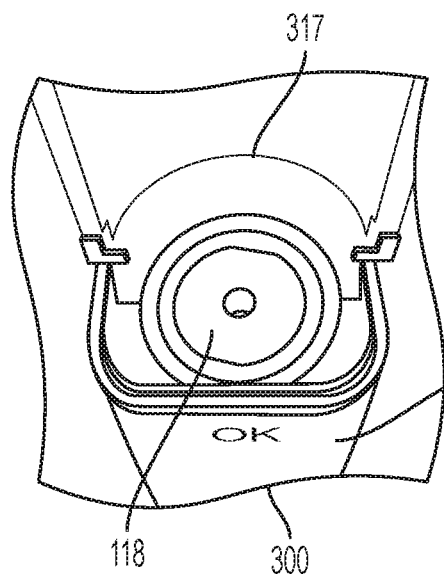
FIGS. 3A-3F show another alternative embodiment of a waterless ice crystal nucleator system for a supercool beverage as may be described herein.
Figure 3B:
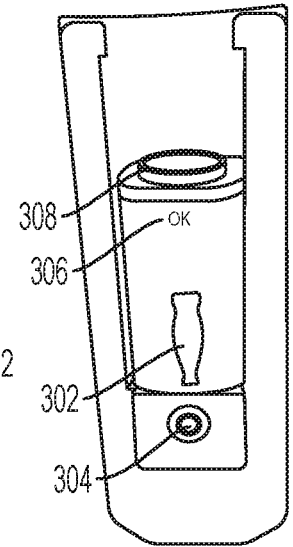

FIGS. 3A-3F show another alternative embodiment of a waterless ice crystal nucleator system 300 for a supercool beverage as may be described herein. As shown in FIG. 3A, the ice crystal nucleator system 300 includes the ultrasonic transmitter 118 exposed above the ultrasonic device 116 housed within the frame 102. As shown in FIG. 3B, a display 302 is provided on a front surface of the frame 102 to indicate the operational states of the ice crystal nucleator system 300, as shown and described in more detail below with reference to FIG. 5. An indicator 306 is also provided on the front surface of the frame 102 to indicate when the operation of the ice crystal nucleator system 300 has completed. A button 304 is also provided on the front surface of the frame 102 configured to activate the ultrasonic device 116.

Mounted on top of the ultrasonic transmitter 118 is a bottle holder 308. The bottle holder 308 may be substantially similar to the aperture 112 described above. The bottle holder 308 includes a mounting flange 315 that is sized to be received in a corresponding recess 317 on the frame 102. The bottle holder 308 may be replaceable to accommodate receiving and orienting different sized packages in direct contact with the ultrasonic transmitter 118, such as described below with reference to FIGS. 3E and 3F.

Figure 3C:
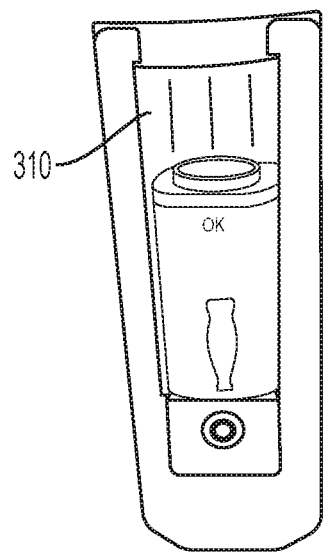

As shown in FIG. 3C, a front cover 310 protects the display 302 and provides additional support around the bottle holder 308 to form the opening 104. For example, the front cover 310 supports a received package so as to not tip over while it is being inserted into the bottle holder 308. The front cover 310 also protects the display 302 and indicator 306 from incidental damage and wear and tear during use.

Figure 3D:
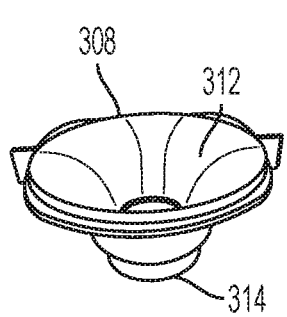
Figure 3E:
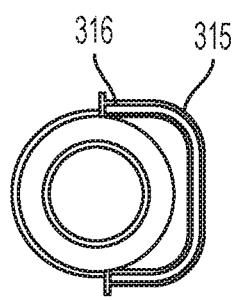
Figure 3F:
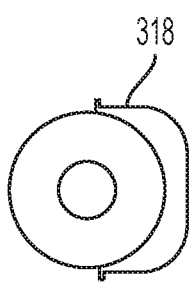

As shown in FIG. 3D, the bottle holder 308 includes a sloped surface 312 and an aperture 314. The aperture 314 is sized to receive and orient a closure of a bottle to be in direct contact with the ultrasonic transmitter 118. As shown in FIG. 3E the bottle holder 308 may be selected to accommodate different sized bottles. As shown in FIG. 3E, a bottle holder 316 may have the aperture 314 with a larger diameter, such as between 33-38 mm. In contrast, as shown in FIG. 3F, the bottle holder 318 may have the aperture with a smaller diameter, such as between 28-33 mm. Accordingly, the ice crystal nucleator system 300 can be modified to have either bottle holder 316 or bottle holder 318 to accommodate different bottle sizes.

Figure 4:
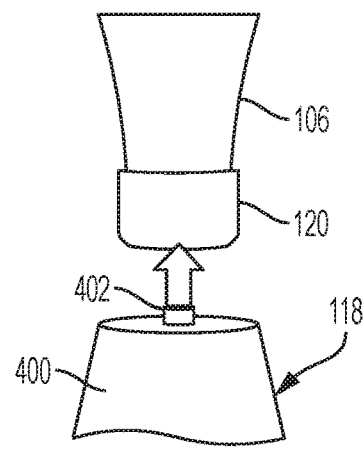
FIG. 4 is a partial plan view of the interaction of another alternative embodiment of a waterless ice crystal nucleator system for a supercool beverage with a beverage container as may be described herein.

FIG. 4 is a partial plan view of the interaction of another alternative embodiment of a waterless ice crystal nucleator system 400 for a supercool beverage 101 with a beverage container 106 as may be described herein. The waterless ice crystal nucleator system 100 is substantially the same as described in FIG. 1 above, with the addition of a contact switch 402 incorporated into the top of the ultrasound transmitter 118. In contrast with the activation of the waterless ice crystal nucleator system 100 through the use of a button on the user interface 108, the waterless ice crystal nucleator system 400 is activated upon the beverage container closing the contact switch 402. Because the waterless ice crystal nucleator system 400 is activated based on the contact switch 402 closing, a button may not be included on the user interface 108. In some implementations, both a button and the contact switch 402 may be used. For example, upon a consumer activating the button on the user interface 108, a check may be performed to ensure that the contact switch is also closed. In some implementations, any or all of the activation mechanisms described above with reference to FIGS. 1-3 may be used.

Figure 5:
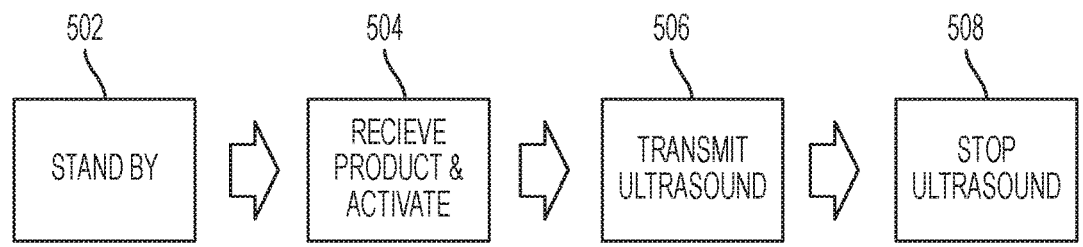
FIG. 5 is a flow chart of the operation of a waterless ice crystal nucleation system for a supercool beverage as may be described herein.

FIG. 5 is a flow chart of the operation of a waterless ice crystal nucleation system for a supercool beverage as may be described herein. The method of FIG. 4 may be used with any of the embodiments of the waterless ice crystal nucleation systems described above. At 502, the waterless ice crystal nucleation system is in a standby state. At 504, a product is received through the opening 104 and a closure of the product is brought into physical contact with the ultrasound transmitter 118 through the aperture 112. The waterless ice crystal nucleation system is activated after receiving the product. For example, the waterless ice crystal nucleation system may be activated upon one or more of receiving a selection on an activation button in a user interface 108, upon detecting that a contact switch 402 is closed, and/or upon detecting a threshold pressure by a pressure sensor 204. At 506, the ultrasonic device 116 activates to transmit ultrasonic energy to the ultrasound transmitter 118, which in turn transfers the ultrasonic energy to the top surface of the closure of the product. The rigid top surface of the closure of the product in turn transfers the ultrasonic energy to the beverage product contained therein. At 508, after a predetermined time period, the ultrasonic device 116 stops transmitting ultrasonic energy. For example, the predetermined time period may be between 1-3 seconds. In another example, the predetermined time period may be between 3-5 seconds.

Figure 6:
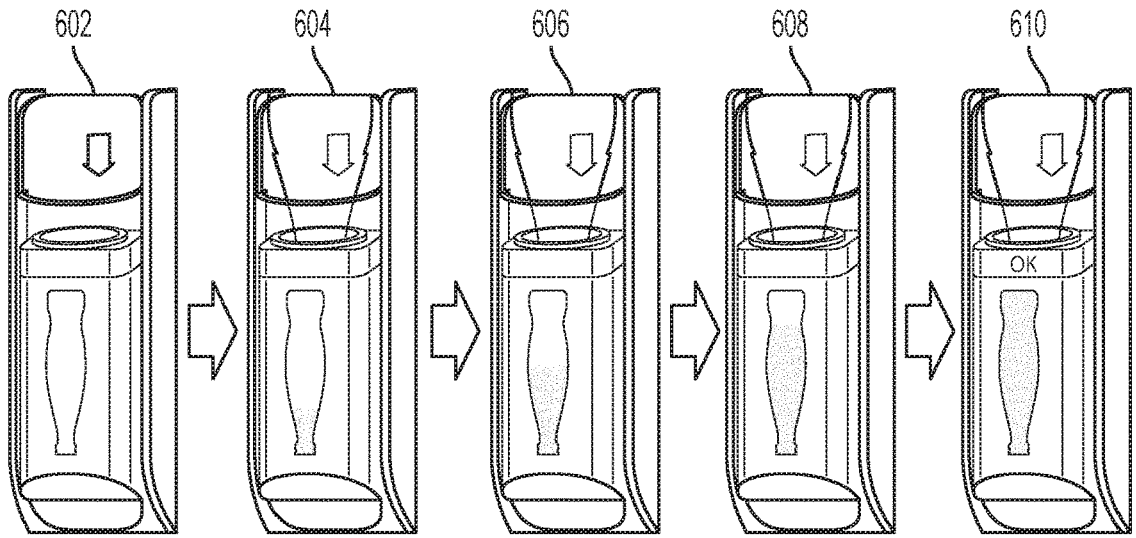
FIG. 6 is sequence diagram of a user interface of a waterless ice crystal nucleation system for a supercool beverage as may be described herein.

FIG. 6 is sequence diagram of a user interface display 202 synchronized to the operation of a waterless ice crystal nucleation system for a supercool beverage as may be described herein. As shown in FIG. 6, the display 202 may change appearance to reflect the different operational states of the waterless ice crystal nucleation system. At 602, the waterless ice crystal nucleation system is in a standby state as indicated by the display 202 not actively displaying any lights or other indications. Therefore, the lack of illumination in the bottle indicates to a consumer that they may insert a supercooled beverage into the waterless ice crystal nucleation system. At 604, a product is received by the waterless ice crystal nucleation system. As shown in FIG. 6, the display 202 illuminates a portion of a beverage bottle close to the closure. For example, upon the pressure sensor 204 or the contact switch 402 detecting the presence of the product, the display 202 may indicate that activation of the waterless ice crystal nucleation system is imminent or to otherwise indicate that the waterless ice crystal nucleation system has activated. Alternatively, the display in 604 may be shown upon receiving a selection of the button on the user interface 108. At 606 and 608, the display 202 indicates a progression of activity while the ultrasonic device 116 is on. As shown in FIG. 6, the illumination of the bottle progressively increases. At 610, the waterless ice crystal nucleation system has completed operation and an indication is given that a consumer may remove the product for consumption. As shown in FIG. 6, the bottle is fully illuminated. Additionally, an "OK" message is illuminated to notify the consumer that it is okay to remove the product for consumption.

Figure 7:
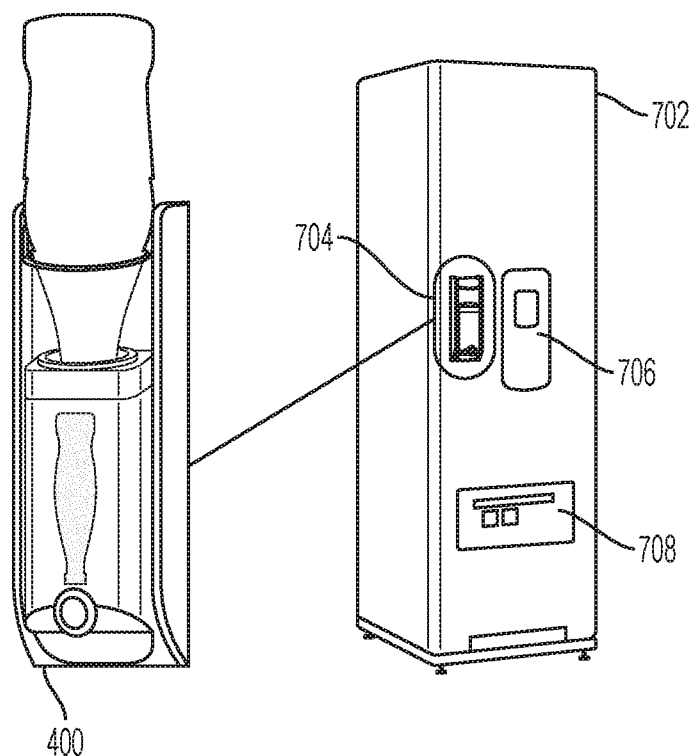
FIG. 7 is a perspective view of a product cooler with a waterless ice crystal nucleator system for a supercool beverage installed thereon.

FIG. 7 is a perspective view of a product cooler 702 with a waterless ice crystal nucleator system 704 for a supercool beverage installed thereon. While shown as embodied as the waterless ice crystal nucleator system 400 described above, the product cooler 702 may have installed any of the systems 100, 200, 400 or variations thereof. The product cooler 702 includes a user interface 706 to dispense a product from a temperature controlled chamber (not shown) to a product port 708. The product dispensed from the cooler 702 may be maintained at a supercooled temperature. The product may then be inserted by a consumer into the waterless ice crystal nucleator system 400 to create an iced beverage.

EXAMPLES

FIGS. 8A-8F show test results for attempted nucleation of ice crystals at various locations for a variety of supercooled single serve beverage product packages. As shown, the shaded arrows in FIGS. 8A-8F represent a successful test whereby application of ultrasonic energy at that location resulted in nucleation of ice crystals within the product package. Likewise, the patterned arrows represent a failed test result whereby application of ultrasonic energy at that location did not result in nucleation of ice crystals within the product package. The locations tested include the closure 802, a shoulder of the packaging 804, a side of the packaging 806, and a base of the packaging 808.

Figure 8A:
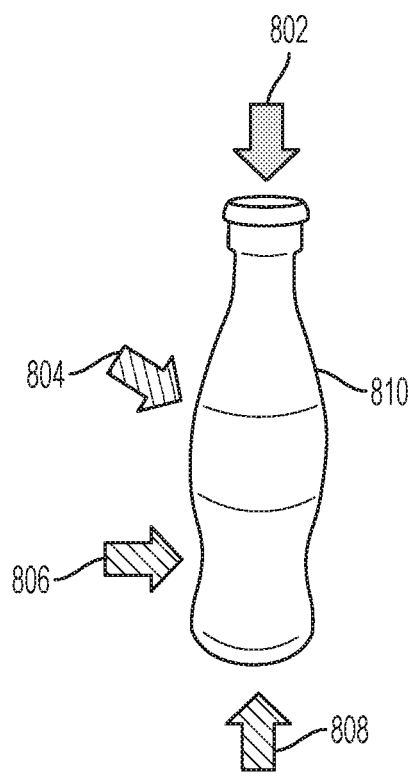
FIGS. 8A-8F show test results for attempted nucleation of ice crystals at various locations for a variety of single serve beverage product packages.
Figure 8B:
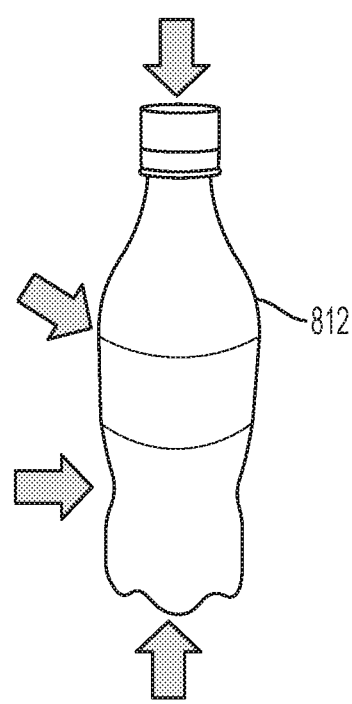
Figure 8C:
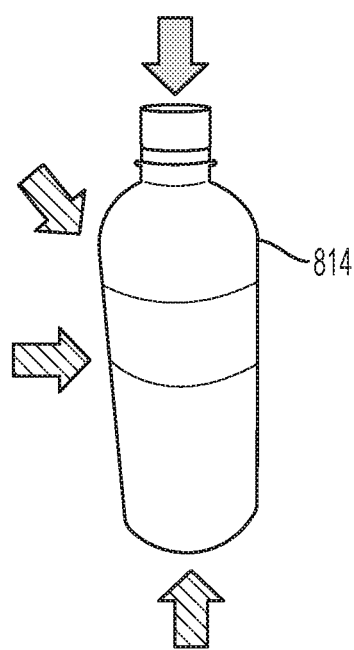
Figure 8D:
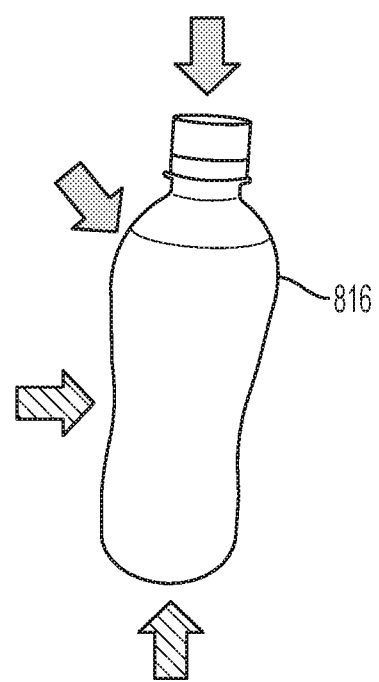
Figure 8E:
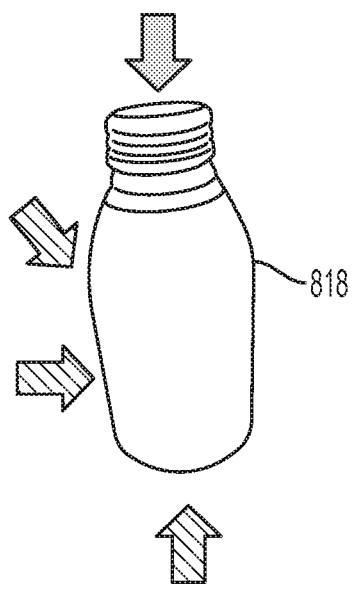
Figure 8F:
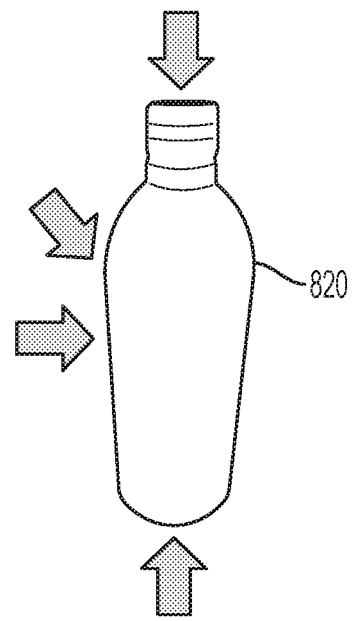

FIG. 8A shows a glass bottle 810 with a metal crown closure, whereby the only successful test was through the application of ultrasonic energy to the closure 802. For example, the glass bottle 810 may be a 12 oz. COCA-COLA glass bottle. FIG. 8B shows a contoured plastic bottle 812 with a rigid plastic closure, whereby all locations resulted in a successful test. For example, the bottle 812 may be a 20 oz. COCA-COLA PET bottle. FIG. 8C shows a straight walled plastic bottle 814 with a rigid plastic closure, whereby the only successful test was through the application of ultrasonic energy to the closure 802. For example, the bottle 814 may be a 500 mL ILOHAS water bottle. FIG. 8D shows a bulbous plastic bottle 816 with a rigid plastic closure, whereby successful tests were obtained on the closure 802 and the shoulder 804. For example, the bottle 816 may be a 500 mL AQUARIUS VITAMIN bottle. FIG. 8E shows an aluminum bottle 818 with a large aluminum closure, whereby the only successful test was through the application of ultrasonic energy to the closure 802. For example, the bottle 818 may be a 250 mL GEORGIA COFFEE bottle. FIG. 8F shows an aluminum bottle 820 with a standard sized aluminum closure, whereby all locations resulted in a successful test. For example, the bottle 820 may be a 250 mL FANTA bottle.

FIGS. 9A-9D show experimental results of nucleation of ice crystals from products dispensed from a cooler. Each of the columns in FIGS. 9A-9D correspond to columns of products within the cooler. For example, the columns 902-914 correspond with a first through sixth columns of products in a cooler. Each of the rows 916 in FIGS. 9A-9D correspond to a product location from the bottom of the cooler. For example, column 1 902 has 19 products in the column in the cooler. In contrast, column 6 914 has 10 products in the cooler. Successful test results 818 are shown by the shaded squares to indicate that desired nucleation of ice crystals occurred in a product at that location. Satisfactory test results 920 are shown by the squares with a slash pattern to indicate that ice crystals nucleated in the beverage, but did not sufficiently propagate within the beverage product at that location. For example, a satisfactory test result may indicate that ice crystal nucleation only occurred in a top third of the beverage. Negative test results 924 are shown by the squares with the cross pattern to indicate that no ice nucleation occurred in a product at that location.

Figure 9A:
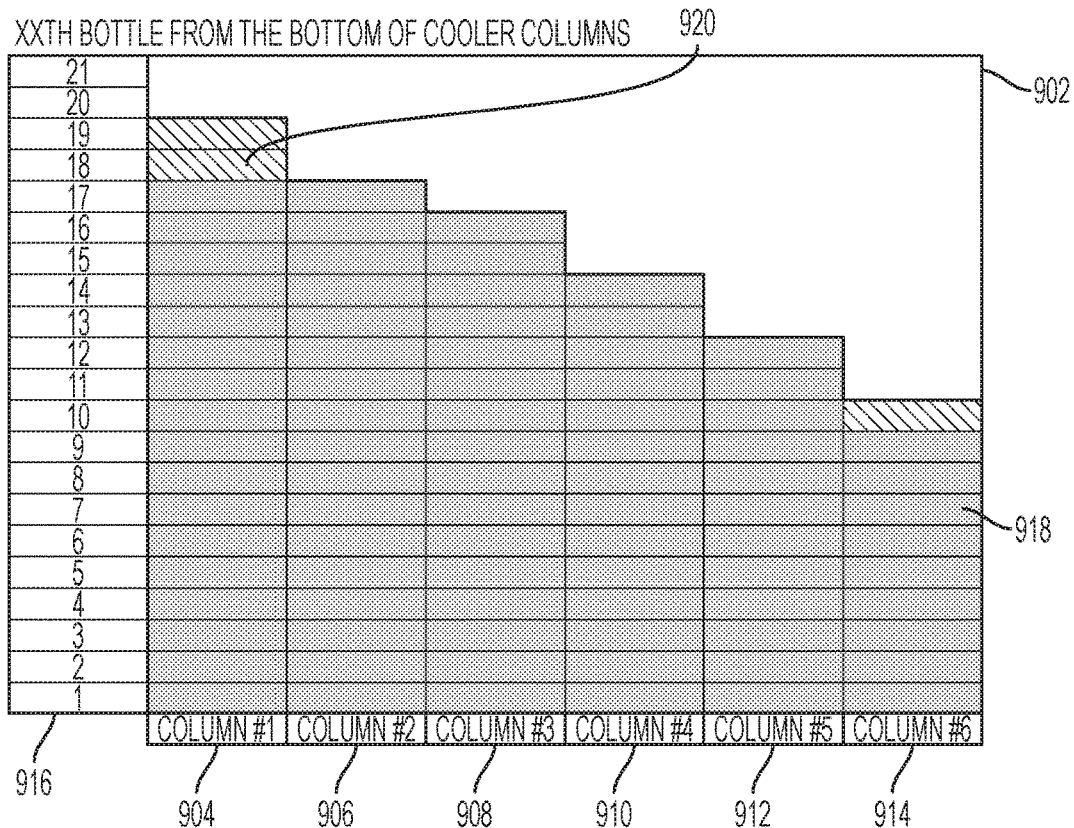
FIGS. 9A-9D show experimental results of nucleation of ice crystals from products dispensed from a cooler.
Figure 9B:
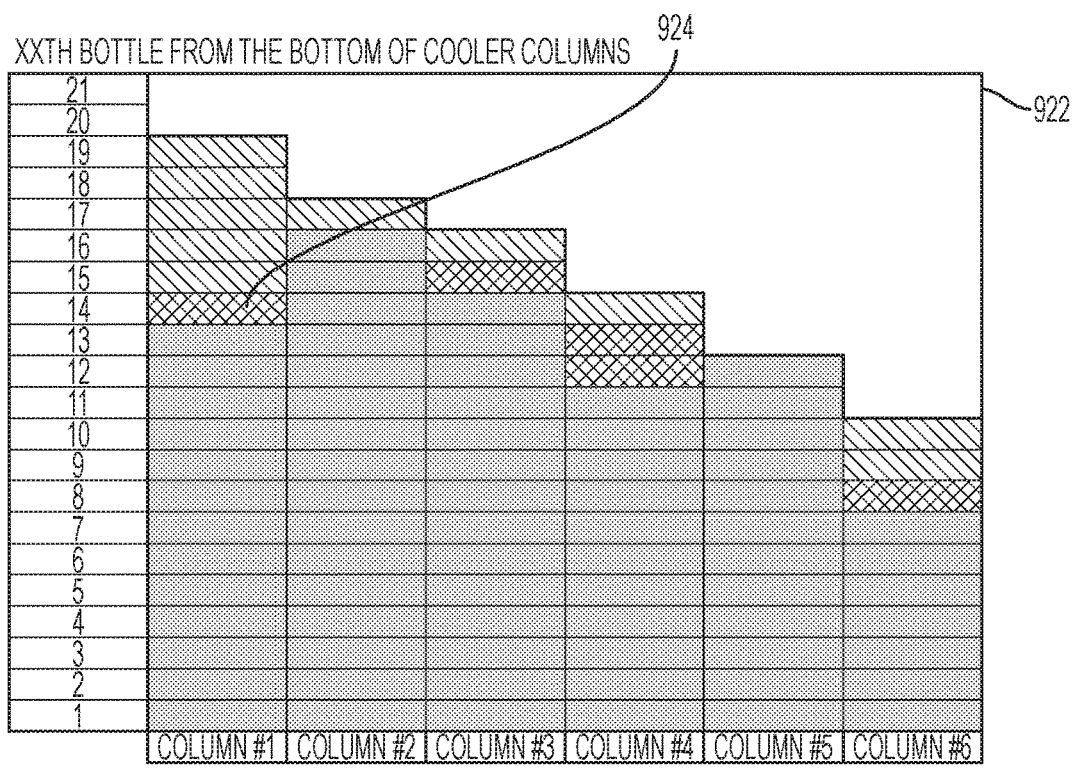
Figure 9C:
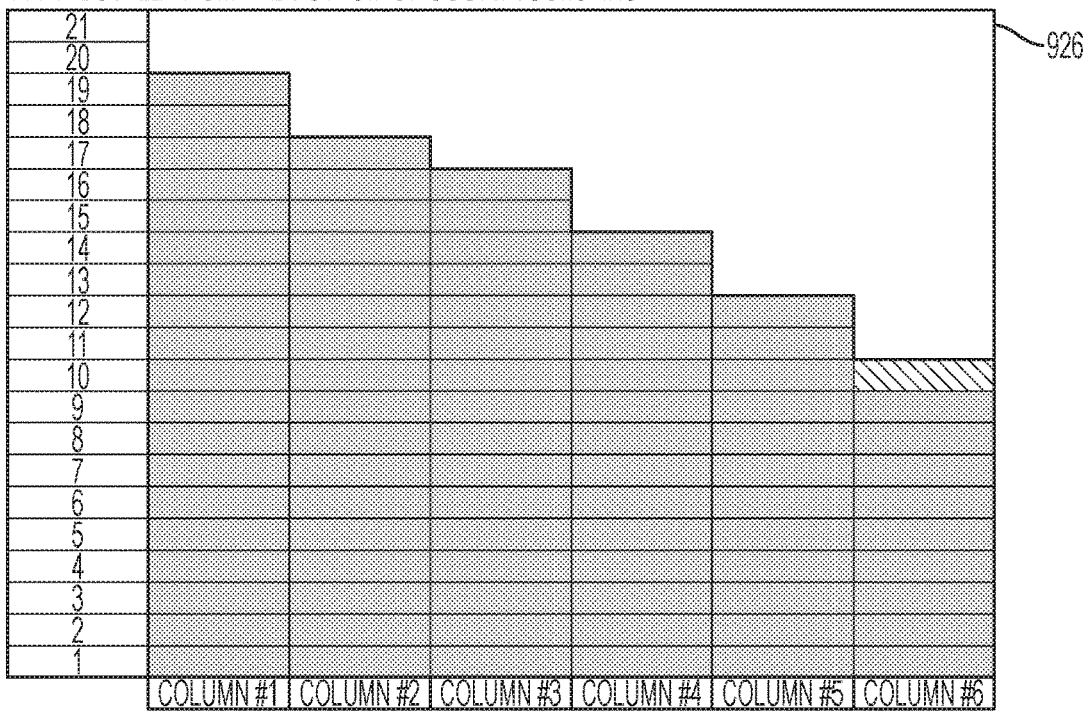

FIG. 9A shows test results 902 for COCA-COLA 500 mL beverages cooled in the cooler to a temperature of −4 C. The waterless ice crystal nucleator system is configured to produce a 28 kHz ultrasonic signal with 70 W of power. FIG. 9B shows test results 922 with the same set-up, but with the waterless ice crystal nucleator system is configured to produce a 28 kHz ultrasonic signal with 5 W of power. FIG. 9C shows test results 926 with the same set-up, but with the waterless ice crystal nucleator system is configured to produce a 28 kHz ultrasonic signal with 10 W of power. When electric power is high, there is a larger likelihood of successful nucleation of ice crystals, but large electrical power also increase equipment cost, electric usage costs, and related electrical parts sizes. Additionally, having a larger electrical power also increases the likelihood of undesirable eruption of product due to excess nucleation of ice crystals. Therefore, it is desirable to identify a minimal power level sufficient to produce consistent successful nucleation, with an acceptable amount of satisfactory and negative results. As shown from the test results in FIGS. 9A-9C, a power level of 5-10 W is sufficient to meet this objective.

Figure 9D:
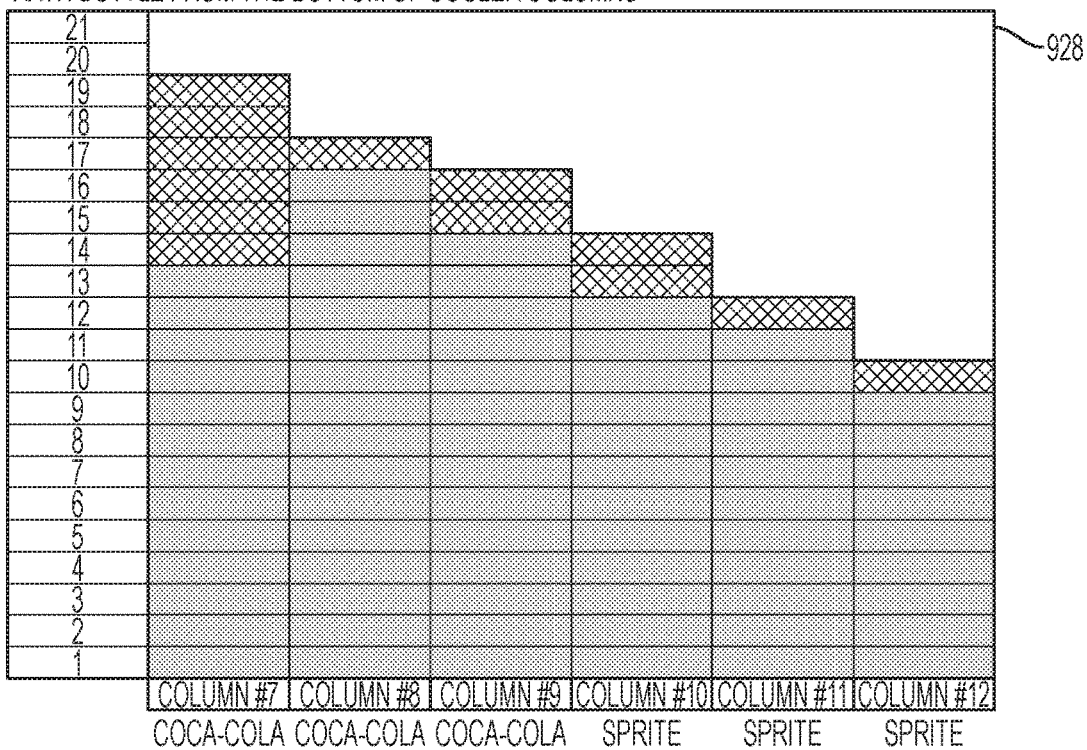

FIG. 9D shows test results 928 for COCA-COLA 500 mL beverages cooled in the cooler to a temperature of −4 C. The waterless ice crystal nucleator system is configured to produce a 40 kHz ultrasonic signal with 5 W of power. As shown, a much larger portion of the test results resulted in negative test results in comparison to the test results of FIG. 9B. Therefore, it has been found that a lower frequency ultrasonic signal is able to produce more consistent results than a higher frequency ultrasonic signal. In some implementations, the frequency of the waterless ice crystal nucleator system is configured to be between 20-30 kHz.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

What is claimed is:

1. A beverage nucleator system for a supercooled beverage container having a neck and a closure, comprising:
    an ultrasonic device including an ultrasonic transmitter, wherein the ultrasonic device is configured to generate an ultrasonic signal; and
    a frame with the ultrasonic device positioned therein;
    the frame comprising a beverage container aperture therein,
    wherein the beverage container aperture is sized to allow for direct contact between the ultrasonic transmitter and the container such that the ultrasonic signal generated by the ultrasonic device is transmitted by the ultrasonic transmitter directly to the container unaltered to cause ice crystal nucleation within the beverage within the container,
    wherein the beverage container aperture is sized for receiving the closure such that the beverage container aperture positions and supports the neck of the beverage container when the beverage container is received within the beverage container aperture, and
    wherein the direct contact on the container is on the closure.

2. The beverage nucleator system of claim 1, wherein the ultrasonic device comprises a contact switch.

3. The beverage nucleator system of claim 2, wherein the contact switch is positioned adjacent to the beverage container aperture.

4. The beverage nucleator system of claim 1, wherein the frame comprises an upper ledge and wherein the upper ledge comprises the beverage container aperture.

5. The beverage nucleator system of claim 1, wherein the ultrasonic device comprises a portable ultrasonic device.

6. The beverage nucleator system of claim 1, wherein the frame comprises a thermoplastic or a stainless steel.

7. The beverage nucleator system of claim 1, wherein the ultrasonic device provides point transmission of ultrasonic energy without the use of a fluid transmission medium.

8. The beverage nucleator system of claim 1, further comprising:
    a button positioned on the frame and configured to activate the ultrasonic device.

9. The beverage nucleator system of claim 1, further comprising:
    a pressure sensor configured to activate the ultrasonic device upon sensing a threshold pressure.

10. The beverage nucleator system of claim 1, wherein the frame and the beverage container aperture are configured to receive a beverage container in an inverted position.

11. The beverage nucleator system of claim 1, wherein the ultrasonic device is configured to provide an ultrasonic signal with a frequency between 5-60 kHz, with a power of 3-100 W, for an amount of time between 100 ms-30 s.

12. The beverage nucleator system of claim 11, wherein the ultrasonic device is configured to provide an ultrasound signal with a frequency between 20-30 kHz, with a power of 5-10 W, for an amount of time between 1-5 s.

13. A method of providing an iced beverage product, comprising:
    receiving a supercooled beverage in a bottle with a neck and a closure such that the closure of the bottle is in direct contact with an ultrasonic transmitter of an ultrasonic device, wherein the ultrasonic device is configured to generate an ultrasonic signal, wherein the bottle is in an inverted position, wherein receiving the bottle comprises positioning the closure in a beverage container aperture of a frame that has the ultrasonic transmitter positioned therein, wherein the beverage container aperture is sized to allow for direct contact between the ultrasonic transmitter and the container such that the ultrasonic signal generated by the ultrasonic device is transmitted by the ultrasonic transmitter directly to the container unaltered, wherein the beverage container aperture is sized for receiving the closure such that the beverage container aperture positions and supports the neck of the bottle when the bottle is received within the beverage container aperture; and
    transmitting ultrasonic energy from the ultrasonic transmitter into the beverage directly through the closure to cause ice crystal nucleation within the beverage.

14. The method of claim 13, further comprising:
    activating an ultrasonic device to transmit the ultrasonic energy from the ultrasonic transmitter in response to a contact switch closing, a button being pressed, and/or a pressure sensor sensing a threshold pressure.

15. The method of claim 13, wherein the step of transmitting ultrasonic energy into the beverage comprises directly transmitting ultrasonic energy through the closure of the bottle without a fluid transmission medium.

16. The method of claim 13, wherein the ultrasonic energy comprises a frequency between 5-60 kHz, with a power of 3-100 W, for an amount of time between 100 ms-30 s.

17. The method of claim 16, wherein the ultrasonic energy comprises a frequency between 20-30 kHz, with a power of 5-10 W, for an amount of time between 1-5 s.

* * * * *